United States Patent
Sherrit et al.

(10) Patent No.: US 8,657,027 B2
(45) Date of Patent: Feb. 25, 2014

(54) SINGLE PIEZO-ACTUATOR ROTARY-HAMMERING (SPARH) DRILL

(75) Inventors: Stewart Sherrit, La Crescenta, CA (US); Xiaoqi Bao, San Gabriel, CA (US); Mircea Badescu, La Canada Flintridge, CA (US); Yoseph Bar-Cohen, Seal Beach, CA (US)

(73) Assignee: California Institute of Technology, Pasadena, CA (US)

( * ) Notice: Subject to any disclaimer, the term of this patent is extended or adjusted under 35 U.S.C. 154(b) by 398 days.

(21) Appl. No.: 12/877,390

(22) Filed: Sep. 8, 2010

(65) Prior Publication Data
US 2011/0056713 A1 Mar. 10, 2011

Related U.S. Application Data

(60) Provisional application No. 61/240,569, filed on Sep. 8, 2009.

(51) Int. Cl.
*E21B 25/00* (2006.01)
*B23B 41/00* (2006.01)

(52) U.S. Cl.
USPC .......... 173/2; 173/90; 310/314; 310/317; 310/323.18; 310/322; 310/323.01; 310/323.21

(58) Field of Classification Search
USPC .......... 173/2, 90; 310/314, 317, 323.18, 322, 310/323.01, 323.21
See application file for complete search history.

(56) References Cited

U.S. PATENT DOCUMENTS

| | | | | |
|---|---|---|---|---|
| 4,420,826 A | * | 12/1983 | Marshall et al. | 367/167 |
| 4,721,107 A | * | 1/1988 | Bolg et al. | 606/128 |
| 5,116,343 A | * | 5/1992 | Ams et al. | 606/128 |
| 6,899,761 B2 | * | 5/2005 | Eissler | 117/83 |
| 7,229,455 B2 | * | 6/2007 | Sakurai et al. | 606/169 |
| 7,572,242 B2 | * | 8/2009 | Boukhny | 604/22 |
| 2002/0165470 A1 | * | 11/2002 | Pal et al. | 601/2 |
| 2004/0007387 A1 | * | 1/2004 | Bar-Cohen et al. | 175/50 |
| 2004/0082884 A1 | * | 4/2004 | Pal et al. | 601/2 |
| 2005/0277869 A1 | * | 12/2005 | Boukhny | 604/22 |
| 2007/0193757 A1 | * | 8/2007 | Bar-Cohen et al. | 173/90 |
| 2009/0236938 A1 | * | 9/2009 | Bromfield | 310/323.19 |
| 2011/0278988 A1 | * | 11/2011 | Young et al. | 310/328 |

OTHER PUBLICATIONS

Bar-Cohen Y., and Zacny, K. (Eds.), "Drilling in Extreme Environments—Penetration and Sampling on Earth and Other Planets" Whiley—VCH, Hoboken, NJ, 2009, pp. 347, 379-390, 741 and 173.*

* cited by examiner

*Primary Examiner* — Michelle Lopez
(74) *Attorney, Agent, or Firm* — Milstein Zhang & Wu LLC; Joseph B. Milstein

(57) ABSTRACT

A Single Piezo-Actuator Rotary-Hammering (SPaRH) Drill includes a horn actuator having high power piezoelectric materials and a flexure pre-stress to increase the actuators effectiveness. The drill is a low mass, low power, compact coring drill measuring 20-cm high by 7-cm diameter and having a total weight of 2 kg including drive electronics. Using an average power of 50-Watts, the drill basalt is expected to cut basalt at a rate of 0.2 cm/min down to depth of 10-cm and create cuttings and an intact core. The drill is expected to operate under different environments including Martian ambient (6 Torr and down to −50° C.), and liquid nitrogen temperatures (77 K) and low pressure (<<1 Torr) to simulate lunar polar and Europa conditions. Materials expected to be sampled include Kaolinite, Saddleback Basalt, Limestone, Volcanic Breccia, Siltstone, ice, permafrost and layered rocks with different hardness.

12 Claims, 7 Drawing Sheets

Helical slotted horn
Direction of motion (extension)

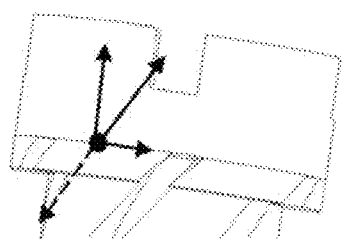 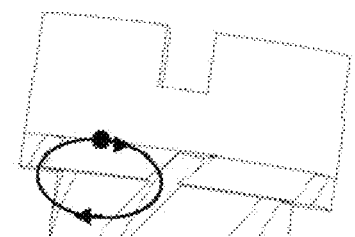
FIG. 10  FIG. 11
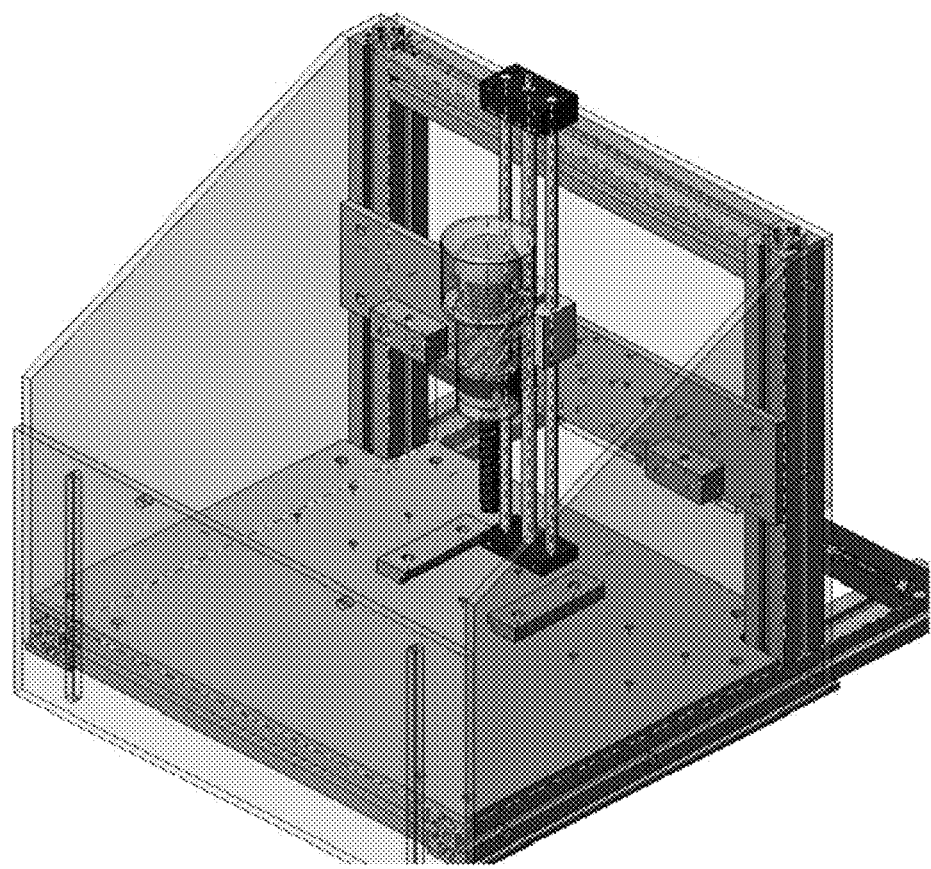
FIG. 12

SINGLE PIEZO-ACTUATOR ROTARY-HAMMERING (SPARH) DRILL

CROSS-REFERENCE TO RELATED APPLICATIONS

This application claims priority to and the benefit of U.S. provisional patent application Ser. No. 61/240,569 filed Sep. 8, 2009 which application is incorporated herein by reference in its entirety. This application is also related to U.S. patent application Ser. No. 11/700,575 filed Jan. 31, 2007.

STATEMENT REGARDING FEDERALLY FUNDED RESEARCH OR DEVELOPMENT

The invention described herein was made in the performance of work under a NASA contract, and is subject to the provisions of Public Law 96-517 (35 U.S.C. §202) in which the Contractor has elected to retain title.

FIELD OF THE INVENTION

The invention relates to piezo-actuated drilling apparatus in general and particularly to a piezo-actuated drilling apparatus that provides both rotary motion and hammering force simultaneously.

BACKGROUND OF THE INVENTION

Motors that provide rotational drilling motion include conventional drills and the Kumada piezo-motor, described in Sashida T., and T. Kenjo, *An introduction to Ultrasonic Motors*, Clarendon Press, Oxford (1993) pp. 13-16. This piezo-motor has been documented to have high efficient of 80%, relatively high torque density of 8.8 Nm/Kg, as described by Kumada A., "A piezoelectric motor," Japanese J. of Applied Physics, Vol. 24, Supplement 24-2 (1985) pp. 739-741. In comparison, Maxon DC Brushless motors have an average efficiency of about 69% and torque density of about 0.2 Nm/Kg, as described in the May 2008 Maxon catalog at page 176.

One application of drills based on rotary motors is in extraterrestrial drilling such as that performed during U.S. and Soviet lunar drilling missions that took place in the early 1970s. In particular, astronauts who flew the Apollo 15, 16 and 17 missions successfully utilized a rotary percussive core drill, the so called Apollo Lunar Surface Drill or ALSD, designed and built by Martin Marietta, to penetrate up to 3.5 m below the surface. There are, however, a number of differences between the Apollo type drilling missions and future planetary missions including the presence of human operators during the Apollo missions and the available preload in the Soviet lunar drilling platforms.

There is a need for a drilling mechanism that can operate efficiently and reliably in the absence of human operators.

SUMMARY OF THE INVENTION

According to one aspect, the invention features a Single Piezo-Actuator Rotary-Hammering (SPaRH) Drill. The SPaRH comprises a single piezoelectric stack actuator having an electrical signal input port and a mechanical signal output port; a horn transducer structure comprising a plurality of slotted helical members, the horn transducer mechanically coupled to the single piezoelectric stack actuator mechanical signal output port to receive a linear mechanical signal from the single piezoelectric stack actuator and configured to provide an output mechanical signal simultaneously having both a longitudinal mode and a twisting mode; and a rotor/stator interface mechanically coupled to the slotted helical members of the horn transducer, the rotor/stator interface configured to receive from the horn transducer the mechanical signal simultaneously having both a longitudinal mode and a twisting mode, and configured to impart a longitudinal motion and a rotational motion simultaneously to a tool.

In one embodiment, the single piezoelectric stack actuator comprises a flexure horn.

In another embodiment, the single piezoelectric stack actuator comprises a pre-stress bolt.

In yet another embodiment, the single piezoelectric stack actuator comprises a piezoelectric single crystal.

In yet a further embodiment, the rotor/stator interface is configured to hold a removable tool by way of a ball detent holding mechanism.

In an additional embodiment, the rotor/stator interface is configured to hold a removable tool by way of a flexure detent holding mechanism.

In one more embodiment, the rotor/stator interface comprises a keyed free mass.

In still a further embodiment, the SPaRH further comprises an electronic driving circuit configured to supply an electrical signal to the electrical signal input port of the single piezoelectric stack actuator.

In one embodiment, the SPaRH further comprises a removable tool.

In another embodiment, the removable tool is selected from the group consisting of a powder bit, a coring bit and a rock abrasion bit.

In yet another embodiment, the removable tool comprises an auger.

In still another embodiment, the removable tool comprises a cuttings collection slot.

In a further embodiment, the single piezoelectric stack actuator is configured to be excited in the range of 3 KHz to 100 KHz.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 10 is a diagram that illustrates how the net force produces a prolonged rotation of the bit as well as an impact.

FIG. 11 is a diagram that illustrates how the bending horn motion, illustrated by the bending ellipse (helical extension or bending) can develop an impact and torque at a point (black dot) on the free mass.

FIG. 12 is an illustration of a testbed stand with a compact rotary hammer sampler attached to a linear slide where the weight can be off loaded.

DETAILED DESCRIPTION

Single Piezo-Actuator Rotary-Hammering (SPARH) Drill

Figure 1:
FIG. 1 shows a solid model view of a piezoelectric actuator that simultaneously generates longitudinal-twisting modes to hammer and rotate the bit.

We describe a Single Piezo-Actuator Rotary-Hammering (SPaRH) Drill, which is believed to provide a novel mechanism of rotary-hammer drilling that is driven by a single piezoelectric stack actuator. The Single Piezo-Actuator Rotary-Hammering (SPaRH) Drill comprises a minimal number of parts. This feature increases the reliability significantly by eliminating the numerous points of potential failure of conventional single motor driven drills. The Single Piezo-Actuator Rotary-Hammering (SPaRH) Drill is applicable to drilling in both terrestrial and extra-terrestrial environments. The Single Piezo-Actuator Rotary-Hammering (SPaRH) Drill makes possible the acquisition of samples from robotic platforms using a compact low-mass drill. The technology can be applied in such fields as geological exploration, the construction industry, the military, and oil exploration. Although the discussion of the invention has been presented with regard to extraterrestrial activity, it is to be understood that many terrestrial applications of the present invention are possible and are expected to be exploited.

The Single Piezo-Actuator Rotary-Hammering (SPaRH) Drill provides a drilling mechanism that combines rotation and hammering driven by a single piezoelectric actuator where the same mechanism simultaneously generates both the rotation and the vibratory (or hammering) action.

The Single Piezo-Actuator Rotary-Hammering (SPaRH) Drill is expected to provide utility in space exploration missions supporting in-situ analyzers and scientific experiments for life and water detection as well as materials characterization. Access of planetary subsurface is an essential element of future space missions, such as exploration of planets, moons and other bodies in our solar system, including such fundamental matters as investigating the possibility of extant life on the planet Mars or the moon Europa, as well as investigating properties of Earth's moon. The Mars environment is believed to comprise 6-torr pressure and temperatures of −50 to −20° C. The lunar polar environment is believed to comprise a pressure of <<1 Ton at temperatures near that of liquid nitrogen (77 K). A sampler based on the Single Piezo-Actuator Rotary-Hammering (SPaRH) Drill is a penetration tool that can rapidly access the subsurface of rocks and other planetary materials using low preload and a single actuator having a minimal number of parts.

Getting under the weathering layer of a planet or moon is vital to understanding the origins and history of surface materials. If an intact core can be acquired and analyzed, a better understanding of the physical and mechanical processes that lead to the breakdown of surface material can be achieved. A principal goal of in-situ extra-terrestrial investigations will be to acquire an un-weathered material to elucidate concepts of planetary formation and geological processes. The exact nature of the weathering layer on different bodies in the solar system depends on several factors including the length of time the rock has been on the surface, and the nature of the weathering (solar wind on the moon, galactic cosmic rays on comets, and atmospheric-rock interactions on Mars). It is expected that the maximum depth of the weathering layer on Mars would be on the order of 2-5 cm. Therefore, it is expected that sample acquisition hardware should be able to achieve at least these depths to acquire un-weathered samples. In the lunar polar region, a desiccated outer 1-5 cm could exist over the volatile-rich material. This material would not be loosely consolidated but have a non-negligible compressive strength. Any mission sent to explore these locations would likely have to achieve depths greater than 5 cm to increase probability of identifying volatile material.

The Technical Problem

The search for present or past life in the universe is one of the most important objectives of NASA's exploration missions. Drills used as subsurface samplers of rocks, ice and permafrost are essential tools for astrobiology studies on other planets and moons. Increasingly, it is recognized that drilling via a combination of rotation and hammering offers an efficient and effective rapid penetration mechanism with the capability to use the rotation as an intrinsic method for removal of cuttings from the borehole while benefiting from the impact and shear forces for fracturing the penetrated medium. The conventional drills that use a single actuator are based on a complex mechanism with many parts and their use in future missions involves a serious risk of failure. Conventional drills may require lubrication that can introduce contamination into the samples that are recovered, which has the potential to cause erroneous analytical results on those samples.

A Solution

A compact drill is disclosed that uses low axial pre-load via vibrations that fractures the rock under the bit kerf and rotates the bit to remove the powdered cuttings while augmenting the rock fracture via shear forces. The vibrations fluidize the powdered cuttings inside the flutes around the bit, which reduces the friction with the auger surface. This mechanical action reduces the consumed power and the heating of the drilled medium, which helps to preserve the produced samples in a pristine condition.

The disclosed drill comprises an actuator that simultaneously impacts and rotates the bit by applying force and torque via a single piezoelectric stack actuator without the need for a gearbox or lever mechanism. This reduces the fabrication cost and complexity of the drill.

The piezoelectric actuator generates impacts and shear forces to fragment the drilled medium directly under the bit kerf by exceeding the tensile and/or shear strength. The percussive impact action of the actuator leads to penetration of the medium by producing a zone of finely crushed rock directly underneath the impacted location. This fracturing process is enhanced by the shear forces from the rotation and twisting action. The bit is constructed with an auger on its internal or external surface to assist in removing the formed cuttings. One of the problems with pure hammering is that as the teeth become embedded in the sample the drilling efficiency drops unless the teeth are moved away from the specific foot-print location. By rotating the drill bit, the teeth will be moved to areas that were not fragmented and enhance the rock fracture via shear forces. The shear motion creates ripping or chiseling action to produce larger fragments to increase the drilling efficiency and reduce the power required to operate the drill.

The actuator of the drill comprises a piezoelectric stack that vibrates a horn. The stack preferably is compressed by a flexure (or in some embodiments, by a pre-stress bolt) between the backing and the horn in order to prevent it from being subjected to tensile stress that will cause it to fail. The backing is designed to transfer the generated mechanical vibrations in the stack towards the horn direction. The horn is configured asymmetrically with helical segments (see FIG. 1 and FIG. 2) in order to cause rotation. Upon impacting the bit the horn introduces longitudinal forces along the axis of the actuator and tangential force causing twisting action that rotates the bit. In addition, bending moments at the horn tip at other frequencies can potentially be used to produce only rotation and little hammering. The longitudinal component of the vibrations of the stack introduce percussion impulses between the bit and the rock (or workpiece), which fracture the rock when the ultimate strain is exceeded under the bit.

Figure 2:
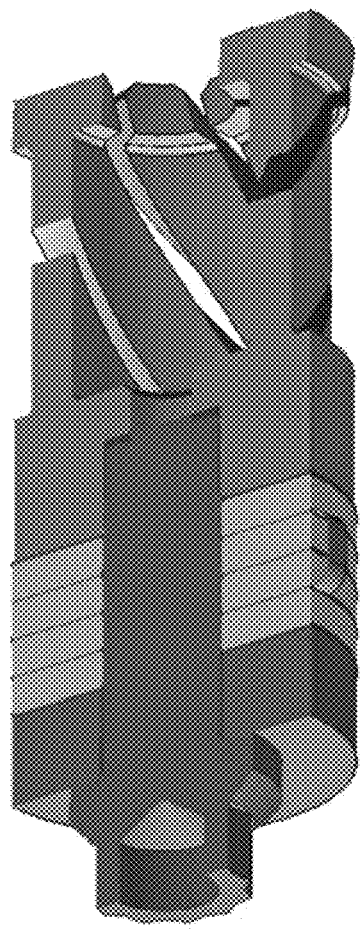
FIG. 2 is a cross-section view of the piezoelectric actuator of FIG. 1
Figure 3:
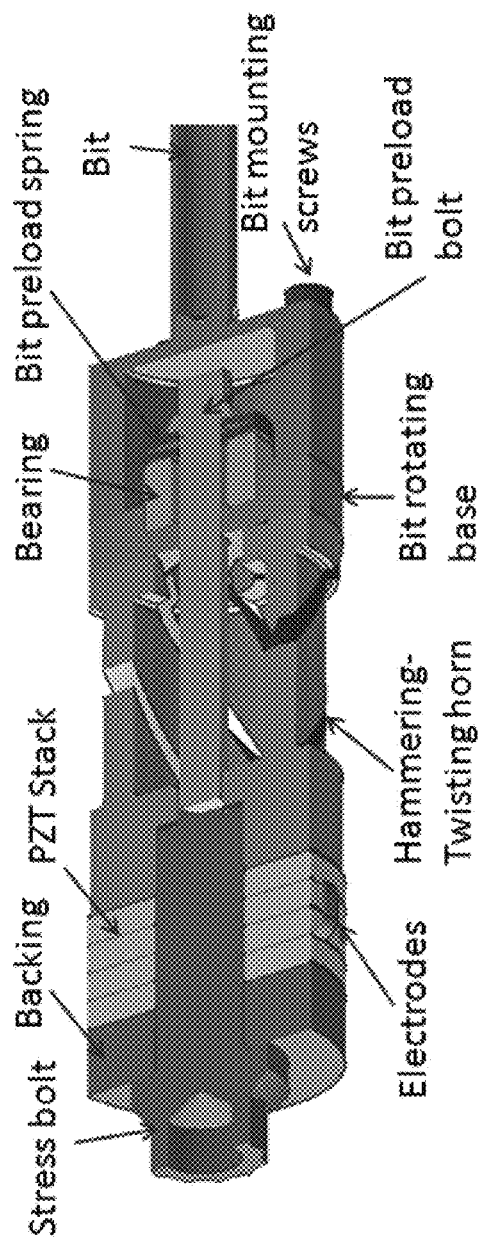
FIG. 3 is a cross section view of the Single Piezo-Actuator Rotary-Hammering (SPaRH) Drill, according to principles of the invention.
Figure 4:
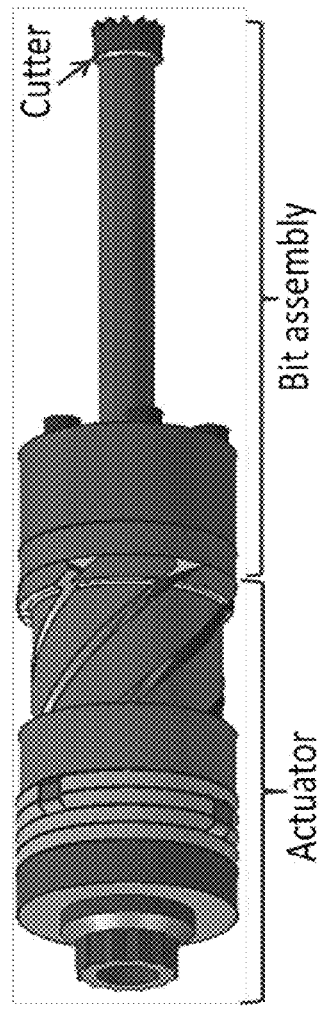
FIG. 4 is a solid isometric view of the Single Piezo-Actuator Rotary-Hammering (SPaRH) Drill.

The actuator that is shown in FIG. 1 represents a combination of a horn for power ultrasonics using vibratory motion as in our Ultrasonic/Sonic Driller/Corer (USDC) design and a novel ultrasonic motor configuration. The horn has a helical slot configuration (shown in FIG. 1 and FIG. 2 that applies rotation forces that turn the bit (acting like a rotor) onto which it is pressed but is also subjected to longitudinal vibrations for hammering. A cross section and solid isometric views of the Single Piezo-Actuator Rotary-Hammering (SPaRH) Drill are shown in FIG. 3 and FIG. 4. The grooved horn converts some of the axial vibrations from the piezoelectric stack into twisting motion on the horn surface. The tangential force produced on the horn surface turns the bit that is pressed against it via a compressive force from the bolt through a bearing, and a high stiffness spring. The bit is interfaced with the horn via a bit rotating base and is bolted to the horn via a bearing and preload spring as shown in FIG. 3.

An advantage of the described mechanism is the ability to produce cores that have high likelihood of maintaining integrity. Further, the powdered cuttings produced are very fine powder that is not expected to sustain crystallographic structure modification.

The Single Piezo-Actuator Rotary-Hammering (SPaRH) Drill has a low mass, uses low power, and is compact. Piezoelectric drills have demonstrated the ability to reach a depth of 10-cm using 1-cm diameter bit. It is expected that the Single Piezo-Actuator Rotary-Hammering (SPaRH) Drill will be able to acquire samples as powdered cuttings and core samples for in-situ geological, mineralogical, and chemical analysis from media with a wide range of hardness levels made of rocks, ice, permafrost, and regolith. Examples of such media include Kaolinite, Saddleback Basalt, Limestone, Volcanic Breccia, and Siltstone, which represent the current range of mechanical properties of rocks that are thought to be encountered on Mars.

Figure 5:
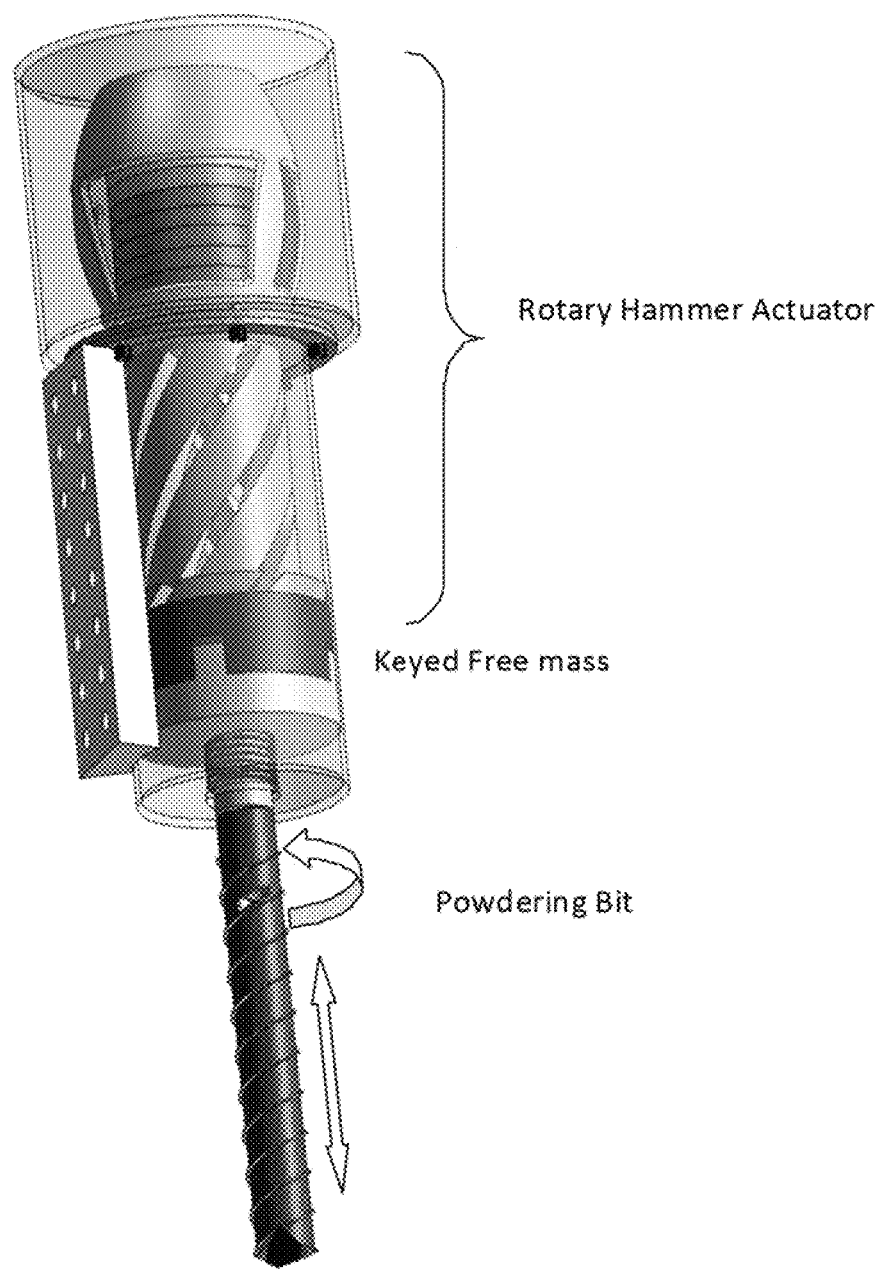
FIG. 5 is a perspective cutaway view of a rotary hammering sample acquisition system showing the ultrasonic horn, free mass and a powdering bit, and indicating the rotary and hammering motions.

FIG. 5 is a perspective cutaway view of a rotary hammering sample acquisition system showing the ultrasonic horn, free mass and a powdering bit, and indicating the rotary and hammering motions.

Figure 6:
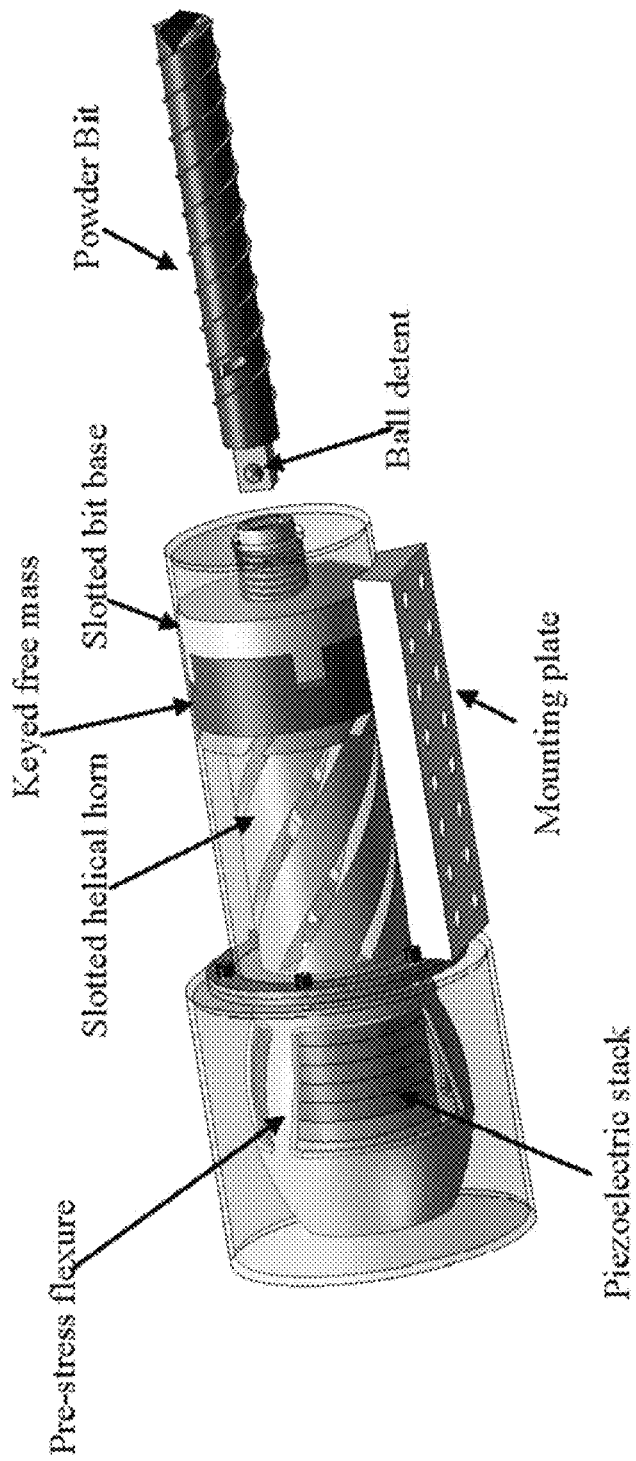
FIG. 6 is an exploded cutaway view that illustrates an embodiment of the sample acquisition system having a prestress flexure and keyed free mass with an exchangeable bit.

FIG. 6 is an exploded cutaway view that illustrates an embodiment of the sample acquisition system having a pre-stress flexure and keyed free mass with an exchangeable bit.

The Single Piezo-Actuator Rotary-Hammering (SPaRH) Drill differs from the USDC in that a single piezoelectric stack actuator will produce both rotation and hammering in the bit. The use of a single actuator significantly minimizes the complexity of the drill design and simplifies the implementation.

Future Mars in situ exploration missions are expected to have, as part of their payload, drills able to acquire cores and fines of subsurface material to at least 5 cm. In addition, such a sampler would benefit future lunar robotic mission to the permanently dark craters on the moon, and for the future surface mission to Europa. All of these missions will require subsurface access to at least 3 cm depth, with the potential requirement of getting to multiple meters depth. Since the sampler will be actuated by a piezoelectric material it will be feasible to operate it at extreme temperatures from as low as tens of degrees Kelvin (for such bodies as Europa and Titan) to as high as several hundreds of degrees Kelvin (as on Mercury and Venus). The information provided by cores produced by the Single Piezo-Actuator Rotary-Hammering (SPaRH) Drill is expected to advance the scientific knowledge of the origin and history of the solar system, the potential for life elsewhere (elucidating concepts regarding the origin of life on Earth), and the hazards and resources present as humans explore space.

In one embodiment, the Single Piezo-Actuator Rotary-Hammering (SPaRH) Drill has an actuator section that is 20-cm high by 7-cm diameter with total weight of 2 kg including drive electronics. Using an average power of 50 Watts, the USDC sampler has been demonstrated to drill basalt at a rate of 0.2 cm/min down to depth of 10-cm and create cuttings and an intact core.

The Lunar Precursor Robotic Program (LPRP) is expected to explore the Moon robotically to obtain data that can be used to characterize the volatile compounds of lunar polar regions and determine their importance for the history of volatiles in the solar system. The determination of the compositional diversity (lateral and vertical) of the ancient crust formed by a differentiated planetary body is expected to be explored on the lunar surface.

Future NASA in-situ exploration missions to such bodies as Saturn's moon, Titan, and the icy satellite of Jupiter, Europa will all require some subsurface access.

It is expected that the Single Piezo-Actuator Rotary-Hammering (SPaRH) Drill will support science objectives of future NASA in-situ exploration missions that involve geological, mineralogical, and chemical analysis, including identification of un-weathered material, inclusion layers within structures, textures, stratigraphy, and organic signatures which exist within sediments, bedrock permafrost, ice, and other near surface geologic forms. The information obtained will advance the scientific knowledge of the origin and history of the solar system, the potential for life elsewhere, and the hazards and resources present as humans explore space. Many analytical instruments for future mission concepts will require the capability to effectively acquire cuttings and core samples. These include such instruments as CheMin, GC/MS, Raman, FTIR and many others. The Single Piezo-Actuator Rotary-Hammering (SPaRH) Drill is expected to obtain cores which will allow the study of the stratigraphy of the subsurface with retention of volatiles inside the core material. The Single Piezo-Actuator Rotary-Hammering (SPaRH)

Drill is expected to be mounted on an arm or body mounted on a 100 kg class rover because it is compact and lightweight and generates low reaction forces.

Parameters of interest in developing a drill include drilling efficiency, drilling power, drilling energy, mechanism lifetime capabilities, core/sample quality, and range of operating environments.

In a preferred embodiment, the Single Piezo-Actuator Rotary-Hammering (SPaRH) Drill which combines rotary and hammering forces as an effective drilling mechanism utilizes three recent advances, including a flexure horn design described in U.S. Provisional Patent Application Ser. No. 61/362,164, and in S. Sherrit, X. Bao, M. Badescu, Y. Bar-Cohen, P. Allen, "Monolithic Flexure Pre-stressed Ultrasonic Horns,"(U.S. Provisional Patent Application Ser. No. 61/362, 164, filed on Jul. 7, 2010), that eliminates the need for a stress bolt in the actuator and allows for 30% increase in the energy density; a helical slotted horn that produces impacts and torque on a keyed free-mass; and high power piezoelectric single crystal materials with high coupling factor ($k_{33}$ =0.9) and mechanical Q (>400) and actuator figures of merit that are 5 times those of standard PZT. In one embodiment the helical slotted horn has slots oriented at a 45degree angle to the central axis of the horn, so that the hammering force and the rotational force are approximately of the same magnitude. By changing the angle of the slots in the slotted horn, one can partition the applied force or power to the hammering force and the rotational force in a desired proportion.

The Single Piezo-Actuator Rotary-Hammering (SPaRH) Drill simultaneously impacts and rotates the bit. The required forces to produce these two motions are produced by a high power single crystal piezoelectric stack actuator that does not require a gearbox. This design is expected to achieve a reduction in cost, mass and complexity. The applied forces and torque can be optimized to produce a highly effective rotary-hammer drilling/sampling mechanism by modeling design features using finite element method (FEM), for example using ANSYS Multiphysics (available from ANSYS, Inc., 275 Technology Drive, Canonsburg, Pa. 15317).

The generated stresses are expected to include impact stress and shear stress and are expected to exceed the tensile and/or shear strength of the drilled medium directly under the kerf (or cutting surface of the bit). The rotation can be augmented by an ultrasonic twisting action that is expected to cause a chiseling effect at the rock/bit interface resulting from twisting shear forces. The percussive impact action is expected to lead to penetration of the medium by producing a zone of finely crushed rock directly underneath the impacted locations. The fracturing process is expected to be enhanced by the shear forces from the rotation and twisting action. To remove the formed cuttings, an auger is provided on the bit whose effect is supplemented by vibration. In some embodiments, the powdered cuttings are expected to travel up the flutes to a cuttings collection slot where they are dropped into the tube for collection.

FIG. 10 is a diagram that illustrates how the net force produces a prolonged rotation of the bit as well as an impact. In FIG. 10, the helical extension horn motion can develop an impact and torque at a point (shown as a black dot) on the free mass. FIG. 11 is a diagram that illustrates how the bending horn motion, illustrated by the bending ellipse (helical extension or bending) can develop an impact and torque at a point (black dot) on the free mass. In FIG. 10 and in FIG. 11, the arrow and the ellipse show contact that pushes the free mass up and drags it to right. The normal force is much lower on retraction or on the bottom portion of the ellipse.

Depending on the structure and drive frequency an angled extension or a bending can occur at the horn free mass interface. Because the horn is in contact only when it is in extension the torque is applied only in one direction. The grooved horn converts some of the axial vibrations from the piezoelectric stack into twisting motion on the horn surface.

The tangential force produced on the horn surface turns the keyed free mass and bit that is pressed against it via a compressive force of a spring that is fixed to the housing. The bit is interfaced with the horn via the keyed free mass.

In addition it is believed that one can optimize the actuation by removing the pre-stress bolt and by using new high power single crystal piezoelectric materials that have been developed for sonar and medical imaging transducers.

Figure 7:
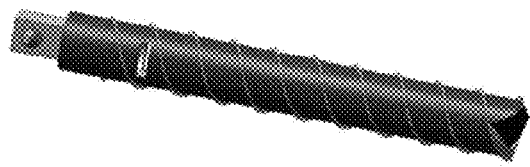
FIG. 7 is an illustration of a powder bit with ball detent.
Figure 8:
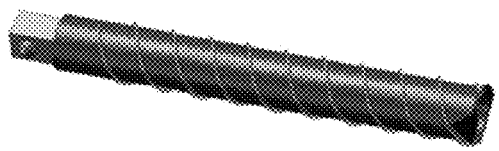
FIG. 8 is an illustration of a coring bit with ball detent.
Figure 9:
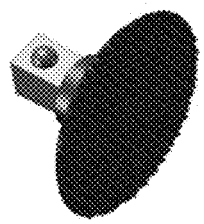
FIG. 9 is an illustration of a rock abrasion bit with ball detent.

To aid the drilling, a crown-shaped cutter on the tip of the bit (that is, a bit comprising a cutter with teeth on its distal end) is expected to be made with specifically designed teeth using an analytical model. Three interchangeable bit types are shown in FIG. 7, FIG. 8 and FIG. 9. For use in unmanned applications such as space exploration, the separation force will be designed to be less than the available arm extension force, so that a robotic device does not become trapped if a bit becomes lodged in a workpiece. We expect to investigate designs of passive and powered core break off and retention mechanisms to break and retain the core in the bit.

High Power Single Crystal Piezoelectric Discs

In some embodiments, the piezoelectric rotary hammer actuator is expected to use high performance piezoelectric materials. Single crystal piezoelectric materials and their methods of fabrication are described at least in U.S. Pat. Nos. 6,491,889, 6,899,761, and 6,942,730 and in U.S. Patent Application Publication Nos. 2002/0179000, 2003/0164137, 2008/0290315, 2009/0211515, 20090212667 and 20090241829. There are also commercial vendors of single crystal piezoelectric materials. For example, TRS Technologies, Inc., 2820 East College Avenue, State College Pa. 16801 sells PMN-28% PT, PMN-30% PT, and PMN-32% PT single crystals. Piezoelectric single crystals (PMN-PT and PMN-PZT) are available from Ceracomp Co., Ltd., 3F-3309, Post Plant 1, Chungnam Techno Park, Jiksan-eup, Cheonan-si, Chungcheongnam-do, South Korea 330-816. These improved ferroelectric single crystals materials make possible significant changes in the design and ultimate performance of many electromechanical devices. Many ultrasound imaging applications offer greater resolution via the increased bandwidth offered by the high $k_{33}$ exhibited by this material. In some embodiments, single crystal piezoelectric material is expected to be used in high power ultrasonic horn actuators.

Conventional high power ultrasonic transducers use acceptor modified "hard" PZT ceramics, which have piezoelectric $d_{33}$ coefficients of 200-300 pC/N. In general, these components operate around their resonance frequency. Near resonance, the output is proportional to the product $d_{33} \cdot Q_m$. The mechanical quality factor $Q_m$ is an important material parameter when designing high power devices. The relatively low Q of some single crystals ($Q_m$~100, compared to $Q_m \geq 1000$ for hard PZTs) has limited their implementation in high power applications. Recently, advances in single crystal ferroelectrics have demonstrated increased Q utilizing two approaches: 1) crystallographic engineering, and 2) acceptor modifications, analogous to hard PZTs.

An equivalent circuit is expected to provide a critical capability in the modeling and simulation of the performance of the piezoelectric actuator. Since the Single Piezo-Actuator Rotary-Hammering (SPaRH) Drill is a dual mode actuator the analytical model will examine two motional branches to determine the longitudinal and torsional tip displacement of the asymmetric horn. The interaction of the bit with the rock will be modeled using rock fracture theory and a finite element approach. The models are expected to be integrated into an analytical too so that the drill performance can be predicted by simulation of the drill operation.

In a preferred embodiment the Single Piezo-Actuator Rotary-Hammering (SPaRH) Drill is expected to be excited in the range of 3 to 100 KHz frequency range. The actuation mechanism that amplifies the amplitude of the vibration will be directly coupled to the drill bit. The analytical model is expected to take into account the electric, electromechanical, thermal and mechanical effects and responses. The model will include the piezoelectric stack, slotted helical horn transducer structure, rotor/stator interface and drill bit, as well as the interfaces to the electronic driving circuit and the rock fracture model. The full analytical model is expected to predict the drill performance for various design configurations and types of rocks. Some of the operating parameters that will be included in the model are the use of different piezoelectric stack materials and sizes, height to length ratio of the transducer, and bit parameters such as length and radius. One can determine the temperature distribution in the drill and most importantly the temperature rise at the bit/rock interface by modeling or mathematical analysis. A parametric matrix study is expected to be performed to optimize the designs, which then can be implemented using a breadboard.

Experimental Corroboration of the Analytical Model

Figure 13:
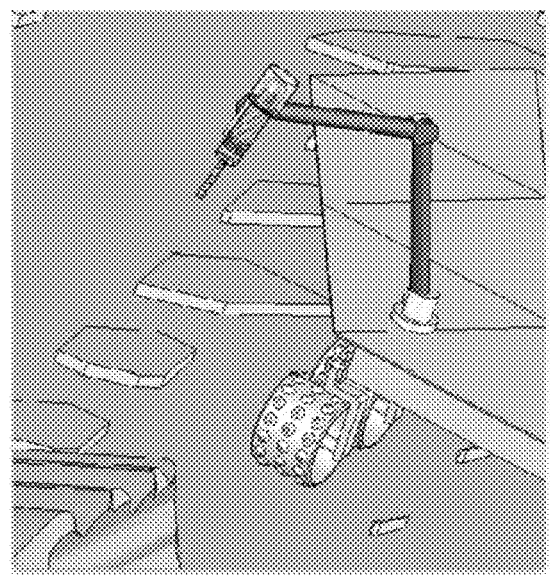
FIG. 13 is an illustration of a support arm (e.g., on a Pluto 100 kg class rover or possibly DEXTER arm testbed) for arm mounted tests.

The analytical model can be corroborated experimentally to assure its applicability and determine its accuracy as a performance predictor for the drill system. The JPL drill testbeds shown in FIG. 12 and FIG. 13 can be modified to test and demonstrate the Single Piezo-Actuator Rotary-Hammering (SPaRH) Drill actuation mechanism. The testbeds can include a mounting fixture with position and preload control to allow testing the effect of various design variables and control parameters. In addition we can use a pulley mechanism and counter mass to off load mass of the drill. The position and axial load on the actuator can be controlled by a voice coil-spring mechanism. A data acquisition system can record the piezoelectric actuator drive signal frequency and power, the piezoelectric actuator temperature, and the voice coil actuator displacement and preload force. The actuator performance can be examined under various operating conditions. The experimental data will provide values for drilling rate, mount vibration and other parameters. The parameters observed will be analyzed and compared to the predictions of the analytical model.

Since the piezoelectric stack actuator is the driver of the Single Piezo-Actuator Rotary-Hammering (SPaRH) Drill, it should be characterized carefully. Generally, most multilayer PZT stacks are designed for precision positioning or low frequency actuation. The coefficients describing the actuation generated by the stack in the spectral range of 20 KHz to 40 kHz or the spectral range of 3 KHz to 100 KHz generally are not available from the vendors and these coefficients preferably should be determined. Experimental characterization of available PZT stacks can be conducted to provide comparison and to generate accurate input data to our analytical model. Small signal measurements of the electric impedance spectrum can be conducted using an impedance analyzer. A LabVIEW-based computer program can be used to extract the basic piezoelectric material properties from the measured data for the single crystal stacks including for example the electromechanical coupling factor, piezoelectric charge constant, dielectric constant, and mechanical modulus. The characteristic operation under a drive from high power signal (high electric field and large deformation) will be modeled. LabVIEW is available from National Instruments Corporation, 11500 N Mopac Expwy, Austin, Tex. 78759-3504.

The performance of the one or more implementations in breadboard can be tested before conducting rock drilling tests under various operating conditions. To test the performance of a drill, a testbed setup is equipped with a signal generator and power amplifier to drive the drill as well as sensors to monitor the voltage, current, vibration amplitude, dynamic stress, and temperature.

The testbed is designed to include a support frame, a slider to hold the drill, a constant force thrust mechanism to provide preload, and a position sensor to monitor the drilling depth. An electronic driver with resonance frequency tracking capability will be provided and the electric input power can be measured. The drilling rate under different input power and preloads can be recorded for analysis. A demonstration using the arm of the Pluto 100 kg class rover or the DEXTER arm testbed will be performed in Earth ambient (e.g., under terrestrial conditions) to investigate and characterize reaction forces.

Figure 14:
FIG. 14 is a photograph of ~10-cm long basalt sample core produced by the Ultrasonic/Sonic Driller/Corer (USDC) that was extracted in 3 pieces.
Figure 15:
FIG. 15 is a photograph of ~10-cm long limestone sample core produced by the USDC that was extracted in 2 pieces.

Examples of ~10-cm long basalt and limestone cores that were produced by the longitudinal vibration of the USDC are shown in FIG. 14 and FIG. 15. These two cores were maintained relatively intact with 2 and 3 segments, respectively. Further, the USDC was demonstrated to sample powdered cuttings that are very fine with minimal crystallographic structure distortions.

The beneficial qualities of the USDC will be maintained in the Single Piezo-Actuator Rotary-Hammering (SPaRH) Drill since the impact forces will be designed to be the same or similar.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A Single Piezo-Actuator Rotary-Hammering (SPaRH) Drill, comprising:

a single piezoelectric stack actuator having an electrical signal input port and a mechanical signal output port;

a horn transducer structure comprising a plurality of slotted helical members, said horn transducer mechanically coupled to said single piezoelectric stack actuator mechanical Signal output port to receive a linear mechanical signal from said single piezoelectric stack actuator and configured to provide an output mechanical signal simultaneously having both a longitudinal mode and a twisting mode; and a rotor/stator interface mechanically coupled to said slotted helical members of said horn transducer, said rotor/stator interface configured to receive from said horn transducer said mechanical signal simultaneously having both a longitudinal mode and a twisting mode, and configured to impart a longitudinal motion and a rotational motion simultaneously to a tool.

2. The Single Piezo-Actuator Rotary-Hammering (SPaRH) Drill of claim 1, wherein said single piezoelectric stack actuator comprises a flexure horn.

3. The Single Piezo-Actuator Rotary-Hammering (SPaRH) Drill of claim 1, wherein said single piezoelectric stack actuator comprises a pre-stress bolt.

4. The Single Piezo-Actuator Rotary-Hammering (SPaRH) Drill of claim 1, wherein said single piezoelectric stack actuator comprises a piezoelectric single crystal.

5. The Single Piezo-Actuator Rotary-Hammering (SPaRH) Drill of claim 1, wherein said rotor stator/interface is configured to hold a removable tool by way of a ball detent holding mechanism.

6. The Single Piezo-Actuator Rotary-Hammering (SPaRH) Drill of claim 1, wherein said rotor/stator interface comprises a keyed free mass.

7. The Single Piezo-Actuator Rotary-Hammering (SPaRH) Drill of claim 1, further comprising an electronic driving circuit configured to supply an electrical signal to said electrical signal input port of said single piezoelectric stack actuator.

8. The Single Piezo-Actuator Rotary-Hammering (SPaRH) Drill of claim 1, further comprising a removable tool.

9. The Single Piezo-Actuator Rotary-Hammering (SPaRH) Drill of claim 8, wherein said removable tool is selected from the group consisting of a powder bit, a coring bit and a rock abrasion bit.

10. The Single Piezo-Actuator Rotary-Hammering (SPaRH) Drill of claim 8, wherein said removable tool comprises an auger.

11. The Single Piezo-Actuator Rotary-Hammering (SPaRH) Drill of claim 8, wherein said removable tool comprises a cuttings collection slot.

12. The Single Piezo-Actuator Rotary-Hammering (SPaRH) Drill of claim 1, wherein said single piezoelectric stack actuator is configured to be excited in the range of 3 KHz to 100 KHz.

* * * * *